(12) United States Patent
Chekroun et al.

(10) Patent No.: US 12,499,672 B2
(45) Date of Patent: Dec. 16, 2025

(54) NEURAL NETWORK AND METHOD FOR IMAGE PROCESSING, EXTRACTION AND AUTOMATIC INFORMATION RECOMBINATION

(71) Applicants: Raphaël Chekroun, Neuilly sur Seine (FR); Eric De La Clergerie, Marly le Roi (FR); DILITRUST, Paris (FR)

(72) Inventors: Raphaël Chekroun, Neuilly sur Seine (FR); Eric De La Clergerie, Marly le Roi (FR)

(73) Assignee: DILITRUST, Paris (FR)

( * ) Notice: Subject to any disclaimer, the term of this patent is extended or adjusted under 35 U.S.C. 154(b) by 310 days.

(21) Appl. No.: 18/029,421

(22) PCT Filed: Sep. 21, 2021

(86) PCT No.: PCT/EP2021/075910
§ 371 (c)(1),
(2) Date: Mar. 30, 2023

(87) PCT Pub. No.: WO2022/078722
PCT Pub. Date: Apr. 21, 2022

(65) Prior Publication Data
US 2023/0368512 A1     Nov. 16, 2023

(30) Foreign Application Priority Data
Oct. 15, 2020   (FR) ...................... 2010541

(51) Int. Cl.
*G06V 10/82* (2022.01)
*G06V 30/148* (2022.01)
(Continued)

(52) U.S. Cl.
CPC ............ *G06V 10/82* (2022.01); *G06V 30/153* (2022.01); *G06V 30/1918* (2022.01); *G06V 30/413* (2022.01)

(58) Field of Classification Search
CPC .... G06V 10/82; G06V 30/153; G06V 30/413; G06V 30/1918; G06F 40/30
See application file for complete search history.

(56) References Cited

PUBLICATIONS

Yang, et al. "Learning to extract Semantic Structure from Documents Using Multimodal Fully Convolutional Neural Networks". (Year: 2017).*

(Continued)

*Primary Examiner* — Daniel G Mariam
(74) *Attorney, Agent, or Firm* — Millen, White, Zelano & Branigan, P.C.; Christopher W. Brody

(57) ABSTRACT

The invention relates to a neural network for semantic segmentation of a document with complex text. The network comprises a first multilayer neural encoding chain of an initial image file of the document to be processed, a second multilayer neural encoding chain of a mask image file of the document to be processed, a multilayer neural decoding chain connected to the outputs of the first and second encoding chains, a first bridge of parallel residual connections between the layers of the first encoding chain and the layers of the decoding chain, a second bridge of parallel residual connections between the layers of the second encoding chain and the layers of the decoding chain, the residual connections generating files of the same size that are connected after a layer of the neural decoding chain generating a file of the same size.

11 Claims, 3 Drawing Sheets

(51) Int. Cl.
*G06V 30/19* (2022.01)
*G06V 30/413* (2022.01)

(56) References Cited

PUBLICATIONS

Martinek Jiri et al., "Building an efficient OCR system for historical documents with little training data", Neural Computing and Applications, vol. 32, No. 23, May 9, 2020, pp. 17209-17227.
Schreiber Sebastian et al., "DeepDeSRT: Deep Learning for Detection and Structure Recognition of Tables in Document Images", 2017 14$^{th}$ IAPR International Conference on Document Analysis and Recognition, vol. 1, Nov. 9, 2017, pp. 1162-1167.

\* cited by examiner

[Fig. 1]
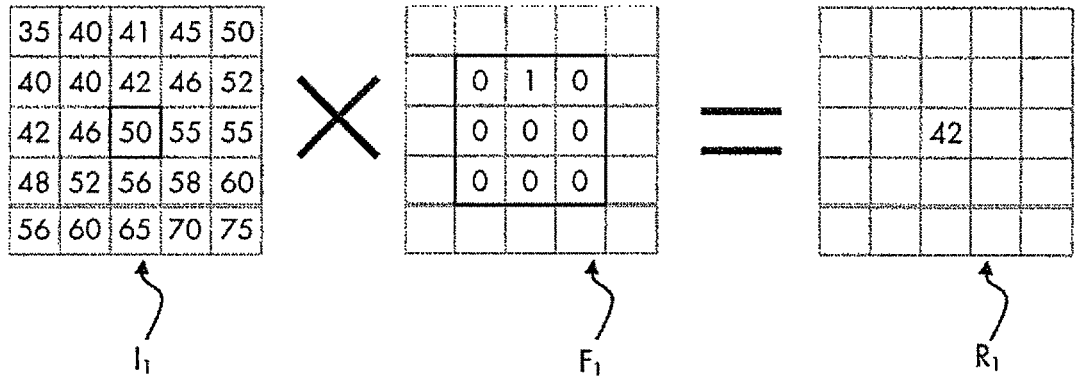
[Fig. 2]
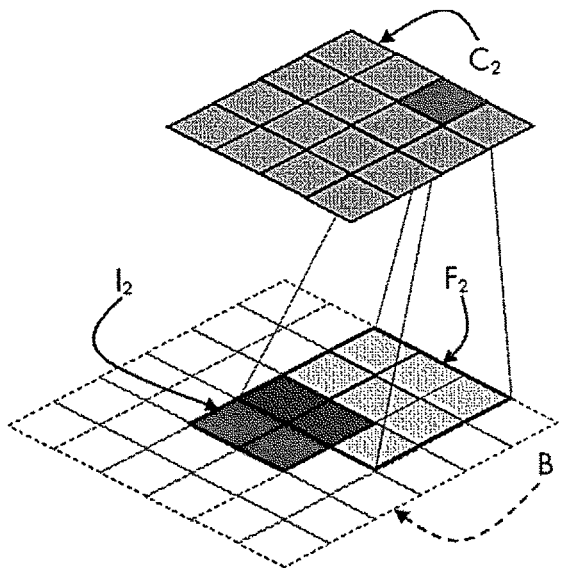
[Fig. 3]
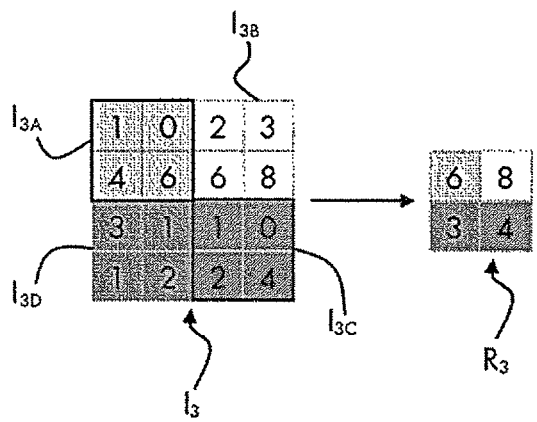
[Fig. 6]
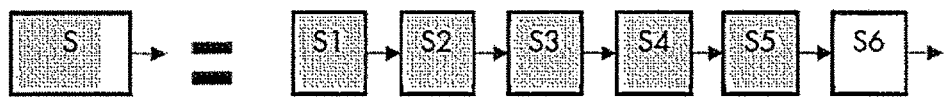

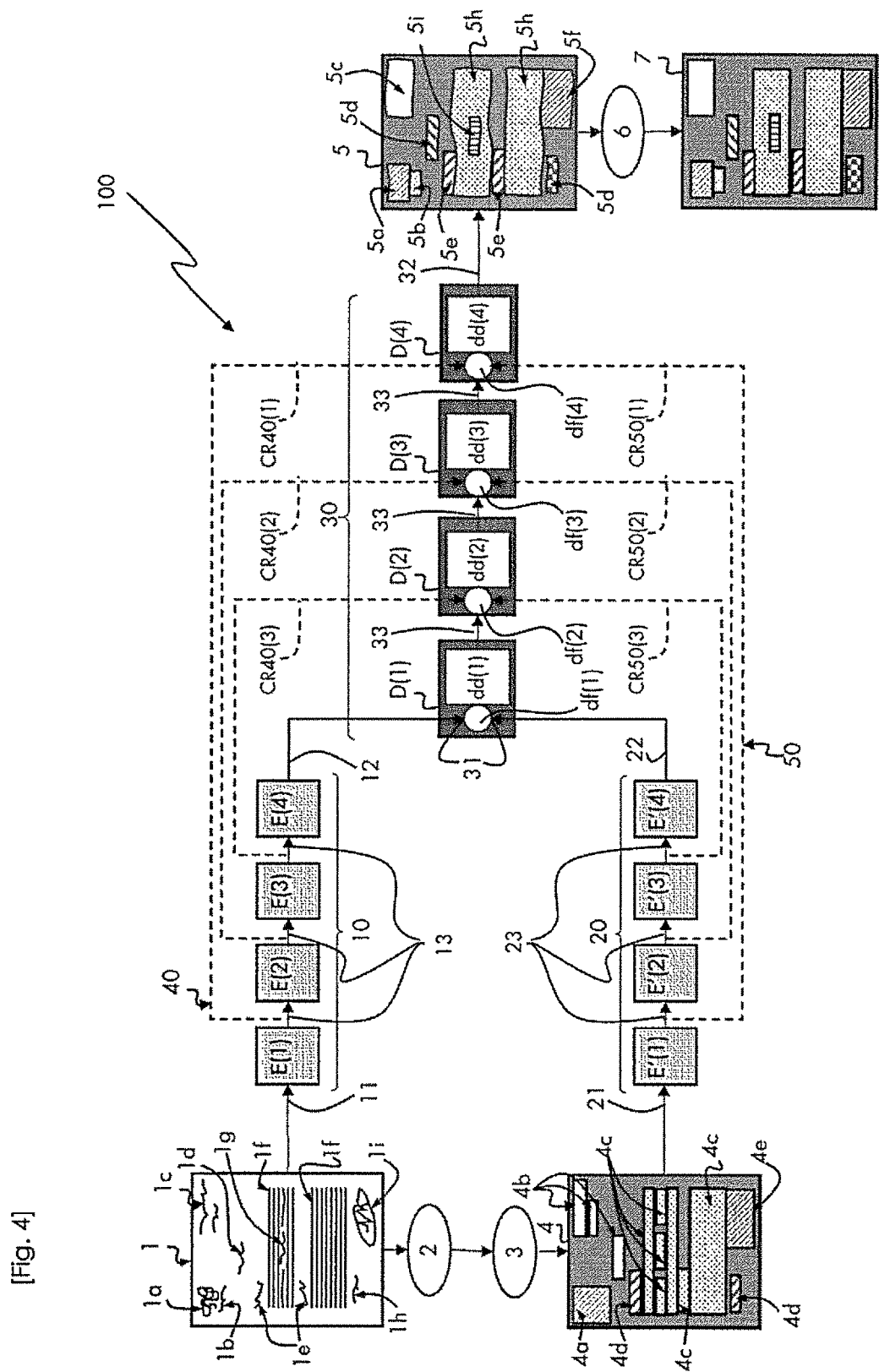
[Fig. 4]

NEURAL NETWORK AND METHOD FOR IMAGE PROCESSING, EXTRACTION AND AUTOMATIC INFORMATION RECOMBINATION

The invention relates to a neural network and to a method for processing images and extracting and recombining information, in particular with a view to semantic segmentation of a complex text document. The invention also relates to programmable devices for implementing said method.

Companies are receiving more and more text documents by post or electronically and need to be able to process them as quickly as possible.

This processing may consist in allowing automatic archiving depending on the type of document and/or indexing depending on the content of the documents, in automatically sending these documents to various recipients depending on the type and/or content of the documents, or in automatically providing to a user a corpus of selected archived documents depending on a selection query made by the user on the basis of the various types of objects indexed.

This processing therefore requires the content of the document—the terms used and their context, the ideas developed, its logical structure—to be analyzed, then the various elements of the document to be indexed according to sought object types.

This analysis is conventionally done by human beings, who may then archive and classify documents depending on their semantic content. For example, after analysis of a document, it is possible to manually input into a software package for managing documents (contracts for example): the logo and name of the issuing company, the addressee and his address, the general heading of the document, the headings of the various sections, the sections, the dates associated with such and such a section, the date of signature, and whether the contract has been signed by identifying the presence of signatures.

Given the number of documents to be processed and their complexity, it has become necessary to provide a method and device for automatically processing these documents, so as to allow them to be analyzed, archived, indexed and consulted.

By text document, what is meant is documents consisting essentially, but not necessarily exclusively, of text. In other words, text documents mainly contain text, but they may also contain a few images (logo, signature), tables, dates, etc.

By complex text document, what is meant is structured text documents, i.e. text documents containing distinct parts and/or forms. This text may take the form of paragraphs, arranged in one or more columns, and also contain headings, dates, tables of text or numbers, images such as logos potentially comprising text, etc.

For example, it may be a question of legal contracts, administrative documents, general conditions of sale, service reports, court decisions, patent documents, scientific articles, or theses.

Conventional methods allowing documents to be automatically processed with a view to allowing them to be analyzed, archived and consulted consist in scanning the document to obtain an image of the document, then carrying out optical character recognition or OCR using specialized image-processing software, so as to obtain a digital text file.

Once this file has been obtained, it is possible to analyze the text of this file so as to extract information therefrom, using semantic-analysis software for example. The result of this analysis makes it possible, for example, to index the document using certain words. In other words, once the document has been received, scanned, converted into digital text and indexed, it is possible, in the data management software, to search for and obtain all the documents including such and such a word or matching such and such a query.

However, for the results of semantic analysis and indexing to be good enough, it is essential, first, for the OCR step to be as good as possible, i.e. for the words to all be recognized without error.

The current trend is therefore to seek solutions allowing OCR software quality to be improved.

The idea underlying the invention is radically different.

Thus, the invention proposes to perform OCR with conventional software, then to combine an analysis of the text obtained by OCR with a topological analysis of an image of the text by a neural network organized into the form of a bi-encoder running in parallel two cascades, i.e. two successions, of different convolutions, followed by a decoder running one cascade of deconvolutions.

Against all expectations, the results obtained as output are much more precise than those obtained by the best semantic-analysis software and further allow much more relevant subsequent indexing, since they contain information on the position of the terms in the document, all this being achieved in a processing time that is very short. In other words, even though the OCR software itself is not modified, the results obtained via the method according to the invention are more precise, because it enriches the document by identifying and classifying zones of the document: signature box, table, sections, headings, etc. Thus, the results obtained via the method according to the invention contain more information (contextual and positional information), allowing better indexing of the content of the document and specific processing to be applied to the zones thus identified. More precisely, they allow much more efficient and refined semantic analysis and indexing, this making it possible to generate search filters that were impossible before, such as, for example, to extract from the text the date of signature or date of renewal of a contract.

One subject of the invention is more precisely a multimodal neural network for achieving semantic segmentation of a complex text document to be processed, the neural network comprising:

a first encoding multilayer neural chain for encoding an initial image file of the document to be processed of determined initial size, the first neural encoding chain having an input receiving the initial digital image file of the document to be processed, a plurality of computation layers generating files of determined sizes, and an output, a second encoding multilayer neural chain for encoding a mask image file of the document to be processed of determined initial size, which file is generated at the end of a segmentation operation carried out on a text file obtained by performing character recognition on the image file of the document to be processed, the second neural encoding chain having an input receiving the mask image file, a plurality of computation layers generating files of determined sizes, and an output;

a decoding multilayer neural chain connected to the output of the first encoding multilayer neural chain and to the output of the second multilayer encoding neural chain, and comprising a plurality of computation layers generating files of determined sizes;

a first bridge of parallel residual connections between the layers of the first encoding multilayer neural chain and the layers of the multilayer decoding neural chain, a second bridge of parallel residual connections between the layers of the second encoding multilayer neural chain and the layers of the multilayer decoding neural chain, the parallel residual connections of the first and second bridges of residual connections generating files of same size being connected after a layer of the decoding multilayer neural chain generating a file of same size.

According to particular embodiments, which may be combined with one another:

in the neural network according to the invention:—the first encoding multilayer neural chain may comprise at least N successive encoding computation blocks that are linked together by a main connection, N being on integer between 2 and 8, the encoding computation blocks of rank 1 to N−1 further each comprising an output residual connection for outputting residual data, each of the N encoding computation blocks executing at least one convolution and at least one downsampling operation, such that:
  when the encoding computation block of rank 1 receives a file of determined initial size, it generates a file of size of rank 1 smaller than the determined initial size; and that
  when an encoding computation block of rank i, i being an integer between 2 and N, receives, via the main connection with the encoding computation block of previous rank i−1, a file of size of previous rank i−1, it generates a file of rank i with a size of rank i smaller than the size of previous rank i−1 of the file received from the encoding computation block of previous rank i−1;
the second multilayer encoding neural chain, parallel to the first multilayer encoding neural chain, may comprise the same number N of successive encoding computation blocks as the first encoding multilayer neural chain comprises encoding computation blocks, the N successive encoding computation blocks of the second encoding multilayer neural chain being linked together by a main connection, the encoding computation blocks of rank 1 to N−1 further each comprising an output residual connection for outputting residual data, each of the N encoding computation blocks executing at least one convolution and at least one downsampling operation, such that:
  the encoding computation block of rank 1 receives a file of determined initial size and generates a file of size of rank 1 smaller than the determined initial size; and
  that an encoding computation block of rank i, i being an integer between 2 and N, receives, via the main connection with the encoding computation block of previous rank i−1, a file of size of previous rank i−1 and generates a file of rank i with a size of rank i smaller than the size of previous rank i−1 of the file received from the encoding computation block of previous rank i−1; and wherein
the decoding multilayer neural chain may comprise the same number N of successive decoding computation blocks as the first encoding multilayer neural chain comprises encoding computation blocks, the N decoding computation blocks being linked together by a main connection, each decoding computation block comprising a fusion sub-block executing at least one fusion of files of identical sizes, followed by a deconvolution sub-block executing at least one deconvolution of the files fused by the fusion sub-block, the decoding computation blocks being linked to the coding computation blocks of the first and second multilayer encoding neural chains such that:
  the fusion sub-block of the decoding computation block of rank 1 receives the files generated by the encoding computation blocks of rank N of the first and second multilayer encoding neural chains;
  the fusion sub-block of the decoding computation block of rank i, for i between 2 and N, receives the files generated by the deconvolution sub-block of the decoding computation block of rank i−1, as well as residual data delivered via the residual output connections by the encoding computation blocks of rank N−(i−1) of the first and second multilayer encoding neural chains.

the first and second multilayer encoding neural chains may each comprise first and second encoding computation blocks each performing two convolutions and one downsampling operation, and third and fourth encoding computation blocks each performing three convolutions and one downsampling operation;

the decoding multilayer neural chain may comprise first, second and third decoding computation blocks, each provided with a deconvolution sub-block for performing a deconvolution, as well as a fourth decoding computation block provided with a deconvolution sub-block for performing a deconvolution and an argmax operation;

in the neural network according to the invention:
  the first encoding multilayer neural chain may comprise, at the output of the encoding computation block of rank N, an output residual connection for outputting residual data and a main connection to a final global encoding computation block, of rank N+1, comprising first and second sub-blocks each performing three convolutions and one downsampling operation, third and fourth encoding computation sub-blocks each performing a convolution, followed by a rectification operation, followed by a dropout operation, a fifth sub-block performing a convolution, and a sixth sub-block performing a deconvolution such that a file leaving the sixth block has a size identical to the size of a file leaving the encoding computation block of rank N, and wherein
  the fusion sub-block of the decoding computation block of rank 1 of the decoding multilayer neural chain receives the files generated by the global encoding computation block of rank N+1 of the first multilayer encoding neural chain, residual data delivered via the output residual connection by the encoding computation block of rank N of the first multilayer encoding neural chain, and the files generated by the encoding computation block of rank N of the second multilayer encoding neural chain; and/or
the first and second multilayer encoding neural chains may be convolutional neural networks chosen from VGG16 networks and RESNet networks.

Another subject of the invention is a method for performing semantic segmentation on a complex text document to be processed, the method comprising the following steps:
  a) obtaining an initial digital image file of the complex text document to be processed, the image file having a determined initial size;
  b) performing optical character recognition on the digital image file to obtain a digital text file;

c) providing a predefined list of object types and performing a segmentation operation so as to assign to each word of the digital text file an object type chosen from the predefined list of object types, d) generating a mask image file coded in values, by replacing each word by a value zone corresponding to the object type assigned to said word, the mask image file being of same determined initial size as the digital image file;

e) providing a first encoding multilayer neural chain comprising at least N successive encoding computation blocks linked together by a main connection, N being an integer between 2 and 8, the encoding computation blocks of rank 1 to N−1 each comprising an output residual connection for outputting residual data, each of the N encoding computation blocks executing at least one convolution and at least one downsampling operation, such that:

the encoding computation block of rank 1 receives a file of determined initial size and generates a file of size of rank 1 smaller than the determined initial size; and that an encoding computation block of rank i, i being an integer between 2 and N, receives, via the main connection with the encoding computation block of previous rank i−1, a file of size of previous rank i−1, and generates a file of rank i with a size of rank i smaller than the size of previous rank i−1 of the file received from the encoding computation block of previous rank i−1;

f) providing a second multilayer encoding neural chain, said chain being parallel to the first encoding multilayer neural chain and comprising the same number N of successive encoding computation blocks as the first multilayer encoding neural chain, the N successive encoding computation blocks of the second encoding multilayer neural chain being linked together by a main connection, the encoding computation blocks of rank 1 to N−1 each comprising an output residual connection for outputting residual data, each of the N encoding computation blocks executing at least one convolution and at least one downsampling operation, such that:

the encoding computation block of rank 1 receives a file of determined initial size and generates a file of size of rank 1 smaller than the determined initial size; and that an encoding computation block of rank i, i being an integer between 2 and N, receives, via the main connection with the encoding computation block of previous rank i−1, a file of size of previous rank i−1 and generates a file of rank i with a size of rank i smaller than the size of previous rank i−1 of the file received from the encoding computation block of previous rank i−1;

g) providing a decoding multilayer neural chain comprising the same number N of successive decoding computation blocks as the first encoding multilayer neural chain comprises encoding computation blocks, each decoding computation block being linked together by a main connection, each decoding computation block comprising a fusion sub-block executing at least one fusion of files of identical sizes, followed by a deconvolution sub-block executing at least one deconvolution of the files fused by the fusion sub-block, the decoding computation blocks being linked to the coding computation blocks of the first and second multilayer encoding neural chains such that:

the fusion sub-block of the decoding computation block of rank 1 receives the files generated by the encoding computation blocks of rank N of the first and second multilayer encoding neural chains;

the fusion sub-block of the decoding computation block of rank i, for i between 2 and N, receives the files generated by the deconvolution sub-block of the decoding computation block of rank i−1, as well as residual data delivered via the output residual connections of the encoding computation blocks of rank N−(i−1) of the first and second multilayer encoding neural chains h) encoding the digital image file in the first multilayer encoding neural chain;

i) encoding the mask image file in the second multilayer encoding neural chain;

j) the deconvolution sub-block of rank N generating a semantic-segmentation mask image file consisting of pixels coded in values, each value corresponding to one object type from the predefined list, the semantic-segmentation mask image file being of same size as the initial digital image file.

According to particular embodiments, which may be combined with one another:

the method may further comprise a step l) of superimposing the digital text file and the semantic-segmentation mask image file, and a classifying step m) consisting in assigning to each word of the digital text file the object type of the rectangle of the semantic-segmentation mask image file superimposed on said word; and/or the method may further comprise a step k) of post-processing the semantic-segmentation mask image file, this step comprising computing coordinates of rectangles covering adjacent pixels of same value and generating a post-processed semantic-segmentation mask image file, a step l') of superimposing the digital text file and the post-processed semantic-segmentation mask image file, and a classifying step m') consisting in assigning to each word of the digital text file the object type of the rectangle of the post-processed semantic-segmentation mask image file superimposed on said word.

Another subject of the invention is an electronic device comprising means for capturing an image of a complex text document to be processed and a central unit programmed to comprise a neural network such as described above and to implement the method such as described above.

Advantageously, the electronic device may be chosen from a scanner, a printer, a photocopier and a smartphone.

Other features of the invention will become apparent from the following detailed description, which is given with reference to the appended figures, which are given by way of example and show, respectively:

FIG. 1 shows a schematic view of the convolution principle applied to a pixel of a starting image;

FIG. 2 shows a schematic view of the deconvolution principle applied to a pixel of a starting image;

FIG. 3 shows a schematic view of a downsampling operation applied to a starting image;

FIG. 4 shows a schematic plan view of a first embodiment of a neural network according to the invention;

FIG. 6 shows a schematic detailed plan view of the final global encoding computation block, of rank N+1, of the second embodiment of the neural network according to the invention.

Figure 5:
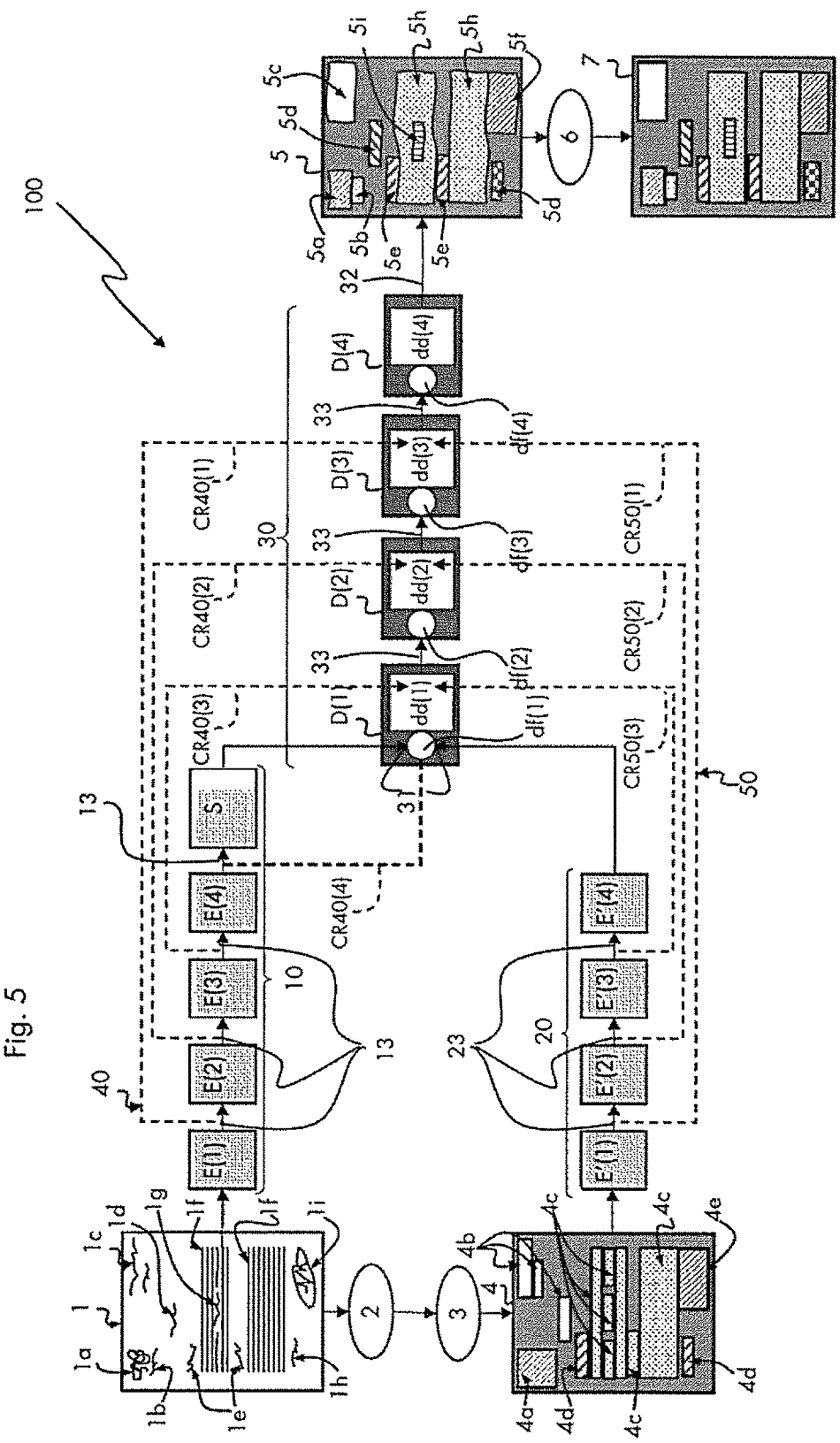
FIG. 5 shows a schematic plan view of a second embodiment of a neural network according to the invention.

Conventionally, by image convolution (referred to simply as convolution here) what is meant is applying a filter by moving it over all the pixels of an image while taking into account neighboring pixels. More formally, it is a mathematical operation between two objects: a starting image (which is, to the computer, a matrix, i.e. an array of size n: for example a height and a width and RGB coding values of each pixel) and a filter (which is also a matrix). The convolution applies the filter to the image, pixel by pixel, following a mathematically predefined formula. A convolution may be used to blur an image, improve its sharpness, detect edges, etc., and its effect depends on the filter used. Applying a convolution to a certain object may decrease its size, i.e. the height and width in number of pixels of the object (considered in matrix form).

Denoting the image I, the filter F (filter of [x1,x2]*[y1, y2]) and R the result of the convolution of I by F, the formula of the convolution is:

$$R(x, y) = (I * F)(x, y) = \sum_{i=x1}^{x2} \sum_{j=y1}^{y2} F(i, j) * I(x-i, y-j)$$ [Math. 1]

FIG. 1 illustrates an example of convolution applied to a single pixel P1 for the sake of clarity. The convolution consists in recomputing the value of pixel P1 of the starting image I1 based on the value of the pixel itself and on the value of the pixels surrounding the pixel to be recomputed.

Each surrounding pixel is assigned a computation coefficient, all the coefficients used being grouped together in a table of values forming the filter F1.

The final value of the pixel in the final image R1 corresponds to a computation taking into account all the surrounding pixels of the pixel P1 in question and the pixel P1 itself, each combined with one of the coefficients of the mask. Next, the mask is "slid" to the next pixel and so on to construct the complete final image.

In the example, by applying the filter F1 to the pixel P1 of value 50 in the starting image I1, a pixel P1 of value 42 is obtained in the final image R1.

Conversely, deconvolution conventionally means a mathematical operation aimed at reversing the effects of a convolution. Convolution coupled with an upsampling operation makes it possible to increase the size of an object, i.e. its height and width in number of pixels, instead of decreasing it.

An oversampling operation is an operation that virtually increases the size of an object, i.e. its height and width in number of pixels. In the example illustrated in FIG. 2, pixels of determined value (here 0) are added to the starting image I2 to obtain a larger intermediate image B. Next, a final image R2 that is larger than the base image A is generated by applying a filter F2 to the intermediate image B.

Moreover, the expression "downsampling operation" is understood to mean, as illustrated in FIG. 3, an operation that takes as input a zone I3 of predefined size of a starting image, subdivides the zone I3 into n sub-arrays of predefined size (here n is equal to 4 and the size is (2,2)) and generates a new zone R3 that contains only certain values (for example the maximum values, the minimum values or the average values depending on the filter applied) of each sub-array I3A, I3B, I3C, I3D—i.e. zone I3. R3 is therefore I3 divided by n in size. Here, I3 is a square of sixteen pixels, and R3 is a square of four pixels, n being equal to 4.

The invention provides a neural network that uses a set of convolutions and deconvolutions in a clever way, making it possible, on the basis of a text document to be processed and of an image file of the text document to be processed, to identify structures of the text document to be processed and to significantly improve the subsequent classification of the words of the text depending on the logical and semantic structures in which they appear.

A neural network is a mathematical object to which an architecture is attributed, which architecture is none other than the order and the way in which operations of a certain nature (convolutions for example) are applied to a (or more than one) input object(s), here a complex text document to be processed. In the case of the invention, the neural network is composed, generally, of an encoding part—a set of operations taking the input object (an image for example) and creating another object or digital file devoid of physical meaning but containing rich semantic information—then a decoding part, which is a set of operations (deconvolutions for example) that compute the sought object (a segmentation mask for example) from the object generated by the encoding part.

The semantic-segmentation neural network according to the invention is characterized in that it is multimodal in the sense that its encoding part comprises two parallel neural chains processing two different files obtained from the same text document to be processed, these two parallel neural encoding chains being fused at the end of the chain before entering a single neural decoding chain.

A neural chain is a chain of successive computational blocks (also called layers) that are linked together by main (or direct) connections, so that the object leaving one computational block enters directly into the next block.

The neural encoding chains and the decoding chain according to the invention are also characterized in that they have an identical number of computation blocks generating, at the output of each block of same rank in the chain, objects of identical sizes, i.e. of the same number of pixels in height and in width. In an optional embodiment described below, the first neural encoding chain may include an additional block, but the output file of which has a size identical to the size (i.e. height and width in number of pixels) of the file it receives as input.

Furthermore, the neural network according to the invention also comprises residual (or indirect; see below) connections linking two different neural chains, namely a neural encoding chain and the neural decoding chain. More precisely, each residual connection links the output of a block generating a file of size n of the neural encoding chains, to the output of the block of the neural decoding chain generating a file of same size n as the block of neural encoding chains after which the residual connection is placed. In other words, a residual connection forms a bridge connecting two layers of two different neural chains. These additional connections make it possible to avoid one or more layers (or blocks) of nonlinear processing and make it possible to add a residual contribution of the preceding layers before conversion of the size of the file by the following layers (or blocks) which are thus "skipped", this ensuring better network stability.

In the neural network according to the invention, each layer of each neural encoding chain is linked to one layer (or block) of the neural decoding chain by a residual connection, so that the layers (or blocks) generating files of same sizes (same number of pixels in height and in width) in the neural encoding chains are linked to the neural decoding chain after a layer (or block) generating a file of same size.

A residual connection between two layers of two neural chains makes it possible to keep an object in memory before it undergoes conversion/an operation in the next block, then to re-exploit it later in the processing chain to use the information that it contains. Thus, a residual connection can be made only between two layers, i.e. after two blocks generating objects (or files) of same sizes, i.e. of same number of pixels in height and in width.

The advantage is to be able to retain or reinforce certain information that may be lost in the course of the operations. As described below, in the case of the present invention, the successive convolutions may cause the image to lose a certain sense of detail: depending on the filters applied, the finest or coarsest objects may become difficult to discern. Adding residual connections allows these details to be preserved.

More precisely, the neural network 100 according to the invention, illustrated in FIG. 4, comprises a first encoding multilayer neural chain 10 intended to receive an initial image file of the document to be processed. The first neural encoding chain 10 therefore has an input 11 that receives the initial digital image file of the document to be processed, a succession of encoding computation blocks E(j) (j being an integer between 1 and N, and N being an integer between 2 and 8), and an output of 12. In FIG. 4, N equals 4.

The neural network according to the invention also comprises a second encoding multilayer neural chain 20 having an input 21 receiving a second type of file described below, a succession of encoding computation blocks E'(j) (j being an integer between 1 and N, and N being on integer between 2 and 8), and an output 22. In FIG. 4, N equals 4. There are an equal number of computation blocks in the first and second neural encoding chains.

The output 12 of the first neural encoding chain and the output 22 of the second neural encoding chain are connected to the input 31 of a decoding multilayer neural chain 30 comprising a succession of decoding computation blocks D(j) (j being an integer between 1 and N, and N being an integer between 2 and 8), and an output 32. In FIG. 4, N equals 4.

One of the features of the invention is that two different files 1-2 obtained from the same text document to be processed are processed, in parallel, in each neural encoding chain 10-20.

In the first encoding chain 10, an image I of the text document, such as an image obtained using a scanner or a photo for example, is processed. This image file 1 is a pixel matrix of initial size R0.

As may be seen in FIG. 4, this image I represents a document comprising a logo 1a with the name 1b of the company that issued the document, an addressee and his address 1c, a general heading 1d, section headings 1e, sections 1f, a date 1g in one of the sections 1f, a date 1h of signature and a signature 1i.

Although the human eye and brain are able to immediately classify the objects of an image depending on their type (here: logo, addressee/address, general heading, section heading, section, date, date of signature and signature), the objective of the invention is to allow the neural network 100 alone to classify these objects depending on their type, with a view to precise and information-rich indexing.

In the second encoding chain, a mask image file 4 generated at the end of a segmentation operation 3 performed on a text file 2 obtained by applying character recognition to the image file 1 of the document to be processed is processed.

The mask image file 4, which is also called a segmentation mask, is an image generated from a starting image at the end of an image segmentation (or classification) operation. This operation is intended to divide the starting image into various zones, depending on the nature of the objects contained in the starting image. For example, if the starting image is an image of a text containing various objects (a background, paragraphs of text, a logo, section headings, a table, a date, a signature, an address, etc.), the segmentation operation aims to identify to which object each pixel of the image belongs. To do this, a predefined list of object types that it is desired to identify in the starting image is used, each object being associated with one pixel value. If the starting file is a digital text file obtained by applying character recognition to an image, the segmentation operation aims to identify to which object each word of the digital text file belongs.

To assign to each pixel or to each word of the digital text file an object type chosen from the predefined list, a classification algorithm using textual prediction is used. This type of algorithm is based on unsupervised learning, and allows automatic semantic structuring and segmentation of the text. Mention may be made, merely by way of example, of the semantic classification method described in the article "Document Structure Analysis Based on Layout and Textual Features" by Stefan Klink, Andreas Dengel and Thomas Kieninger, Computer Science, 2000.

More generally, it is possible to employ simple tools for structuring textual documents logically/semantically based on models the components (or rules) of which are regular expressions, in addition to complements regarding the absolute/relative position on the page and optionally the case of the characters (bold, italic, etc.).

Thus, in short, the mask image file 4 is produced in the following way:
- the document is scanned and subjected to character recognition (OCR);
- the file resulting from the OCR (text with coordinates and optionally with information on case) is sent to a logical/semantic structuring algorithm based essentially on textual content;
- this algorithm returns a structure in the form of zones with a type (table, heading, section, etc.) and coordinates;
- the mask 4 is constructed based on this structure by associating, with each pixel P covered by a zone 7, a value C (for example translated into the form of a color C) corresponding to the type T of said zone Z (with a default value for pixels that are not covered), so that the mask 4 has the same dimensions as the initial image.

Next, a mask image file coded in values and illustrating the result of this segmentation is generated, in such a way that each pixel of the image is given the value that corresponds to the object of the pixel or of the word present in the same place in the starting image. In other words, the mask image file 4 is generated, each word being replaced by a zone (for example a rectangle) of value corresponding to the object type assigned to said word. In the end, the mask image file has the same size, i.e. the same number of pixels in height and in width, as the initial size R0 of the starting image file, or of the image file used to generate the digital text file by character recognition.

In the method according to the invention, optical character recognition is carried out on the image file 1 of the document to obtain a digital text file 2. Next, based on a predefined list of object types to which the words of the text may belong (for example: logo, addressee/address, general heading, section heading, section, date, date of signature and signature), a segmentation operation 3 is performed to assign to each word of the digital text file an object type chosen from the predefined list of object types. It is then possible to generate a mask image file 4 each pixel of which is coded in value, by assigning, to each pixel located at the same positional coordinates as the word or in its neighborhood (for the sake of simplicity replaced by rectangles), the value assigned to the object type assigned to said word. In FIGS. 4 and 5, the pixels have been coded using values symbolized by fill patterns or colors, as they would be done on a computer screen. The colors or patterns themselves are not important, and simply serve to embody coding of the pixels using various values. The wordless zone is assigned to the background and colored, in the figure, solid dark gray. Of course, neighboring zones of same value are advantageously grouped together to obtain a mask image file composed of pixels coded in object-type values.

On automatic implementation by a computer system, there is no need to actually edit the mask since no human will ever consult it. Thus, all the pixels of a determined zone located at the positional coordinates of a word to which an object type was assigned in the segmentation operation have the same value, corresponding to one value.

This mask file 4 has the same determined initial size R0 as the digital image file 1 of the document to be processed.

The mask image file 4 thus generated contains segmentation information on the document to be processed.

As shown in FIG. 4, the mask image file 4 resulting from the OCR 2 and segmentation 4 is imperfect due to the imperfection of known optical character recognition and segmentation software. In the example shown, the image file 4 makes no distinction between the logo 1a and the name 1b of the issuing company, these being grouped together under the same rectangle 4a, which has been hatched with the thin lines coding the drawings of the text. The addressee 1c and the general heading 1d are divided into three distinct zones 4b, but classified under the same type (plain white rectangles 4b). One section heading 1e has been classified in the same way as the sections 1f, as has the date 1g located in section 1f, the whole of which is divided into several distinct zones 4c classified under the same type: dotted rectangles 4c. Lastly, the signature date 1h has been classified in the same way as the section headings 10 and illustrated by a rectangle 4d hatched with thick lines. The signature has been recognized as a drawing in the text—it has been replaced by a rectangle 4e hatched with thin lines. Thus, the mask 4 is generally imperfect, because it uses only some of the information present in the image, namely the information provided by the OCR tools.

It will therefore be understood that indexing a document based on such a mask image file 4 would necessarily lead to many errors. By processing this mask image file 4 in parallel with the image file 1 in the neural network according to the invention, the automatic classification of the various zones is significantly improved, this ultimately allowing much better automatic indexing of the documents.

According to the invention, the neural network also comprises a first bridge 40 of parallel residual connections CR40(k), k being an integer between 1 and N−1, between each of the layers E(1) to E(N−1) of the first encoding multilayer neural chain 10 and each of the layers D(1) to D(N−1) of the decoding multilayer neural chain 30.

The neural network 100 according to the invention also comprises a second bridge 50 of parallel residual connections CR50(k), k being an integer between 1 and N−1, between each of the layers E'(1) to E'(N−1) of the second encoding multilayer neural chain 20 and each of the layers D(1) to D(N−1) of the decoding multilayer neural chain 30.

In FIG. 4, N being equal to 4, each bridge 40-50 comprises three parallel residual connections: CR40(1), CR40(2), CR40(3), CR50(1), CR50(2) and CR50(3).

As explained above, the parallel residual connections of the first and second residual connection bridges generating files of same sizes, i.e. of the same number of pixels in height and in width, are connected after a layer of the decoding multilayer neural chain generating a file of same size.

Thus, in FIG. 4:
the residual connection CR40(1) connects the output of block E(1) of the first encoding multilayer neural chain 10 and the output of block D(N−1) (block D(3) in FIG. 4) of the decoding multilayer neural chain 30;
the residual connection CR40(2) connects the output of block E(2) of the first encoding multilayer neural chain 10 and the output of block D(2) of the decoding multilayer neural chain 30;
the residual connection CR40(3) connects the output of block E(3) of the first encoding multilayer neural chain 10 and the output of block D(1) of the decoding multilayer neural chain 30;
the residual connection CR50(1) connects the output of block E'(1) of the second encoding multilayer neural chain 20 and the output of block D(N−1) (block D(3) in FIG. 4) of the decoding multilayer neural chain 30;
the residual connection CR50(2) connects the output of block E'(2) of the second encoding multilayer neural chain 20 and the output of block D(2) of the decoding multilayer neural chain 30; and
the residual connection CR50(3) connects the output of block E'(3) of the second encoding multilayer neural chain 20 and the output of block D(1) of the decoding multilayer neural chain 30.

Specifically, since the computation blocks of the first and second encoding chains 10-20 perform convolutions, the size of the files leaving each block decreases. Conversely, since the computation blocks of the decoding chain 30 perform deconvolutions, the size of the files leaving each block increases until a file with the same initial size R0 as the image file 1 or the mask image file 4 is obtained.

Thus, the residual connections never cross within a given bridge 40-50.

In more detail, the first encoding multilayer neural chain 10 comprises N successive encoding computation blocks E(1) to E(N) that are linked together by a main connection 13 (solid line in the figures), N being an integer between 2 and 8, each of the N encoding computation blocks executing at least one convolution and at least one downsampling operation. Thus, when the encoding computation block E(1) of rank 1 receives a file of determined initial size R0, it generates a file of size of rank 1 smaller than the determined initial size R0.

More generally, when an encoding computation block E(i) of rank i, i being an integer between 2 and N, receives, via the main connection 13 with the encoding computation block E(i−1) of previous rank i−1, a file of size of previous rank i−1, it generates a file of rank i with a size of rank i smaller than the size of previous rank i−1 of the file received from the encoding computation block E(i−1) of previous rank i−1.

The same goes for the second encoding multilayer neural chain 20, parallel to the first encoding multilayer neural chain 10. It comprises the same number N of successive encoding computation blocks E'(1) to E'(N) as the first encoding multilayer neural chain 10 comprises encoding computation blocks.

The N successive encoding computation blocks E'(1) to E'(N) of the second encoding multilayer neural chain 20 are linked together by a main connection 23 (solid line in the figures) and execute at least one convolution and at least one downsampling operation, such that the encoding computation block E'(1) of rank 1 receives a file of determined initial size R0 and generates a file of size of rank 1 smaller than the determined initial size R0.

More generally, an encoding computation block E(i) of rank i, i being an integer between 2 and N, receives, via the main connection 23 with the encoding computation block E'(i−1) of previous rank i−1, a file of size of previous rank i−1, and generates a file of rank i with a size of rank i smaller than the size of previous rank i−1 of the file received from the encoding computation block E'(i−1) of previous rank i−1.

Furthermore, the decoding multilayer neural chain 30 comprises the same number N of successive decoding computation blocks D(i), for i ranging from 1 to N (D(1) to D(N)), as the first encoding multilayer neural chain 10 comprises encoding computation blocks, the successive decoding computation blocks D(1) to D(N) being linked together by a main connection 33.

Each decoding computation block D(i), i ranging from 1 to N (in the figure N=4), comprises a fusion sub-block df(i) executing at least one fusion of files of identical sizes to generate a resulting file, the fusion sub-block df(i) being connected to a deconvolution sub-block dd(i) executing at least one deconvolution of the resulting file transmitted by the corresponding fusion sub-block df(i).

The encoding computation blocks of rank 1 to N−1 of the first and second multilayer encoding neural chains 10-20 further each comprise an output residual connection for outputting residual data, which is connected to the deconvolution sub-blocks dd(1) to dd(N) of the decoding computation blocks of the decoding multilayer neural chain 30 such that:

the fusion sub-block df(1) of the decoding computation block D(1) of rank 1 receives the files generated by the encoding computation blocks E(N) (directly in the context of FIG. 4, or indirectly in the context of the option illustrated in FIG. 5) and E'(N) of rank N of the first and second multilayer encoding neural chains; and that the fusion sub-block df(i) of the decoding computation block D(i) of rank i, for i between 2 and N, receives the files generated by the deconvolution sub-block dd(i−1) of the decoding computation block D(i−1) of rank i−1 as well as residual data delivered via the output residual connections CR40(N−(i−1)) and CR50(N−(i−1)) by the encoding computation blocks E(N−(i−1)) and E(N−(i−1)) of rank N−(i−1) of the first and second multilayer encoding neural chains (10-20).

Thus, in FIG. 4:

the fusion sub-block df(2) of the decoding computation block D(2) of rank i=2 receives the files generated by the deconvolution sub-block dd(1) of the decoding computation block D(1) of rank 1, as well as residual data delivered via the output residual connections CR40(3) and CR50(3) of the encoding computation blocks E(3) and E'(3) of rank N−(2-1)=3 (for N=4) of the first and second multilayer encoding neural chains 10-20;

the fusion sub-block df(3) of the decoding computation block D(3) of rank i=3 receives the files generated by the deconvolution sub-block dd(2) of the decoding computation block D(2) of rank 2, as well as residual data delivered via the output residual connections CR40(2) and CR50(2) of the encoding computation blocks E(2) and E(2) of rank N−(3-1)=2 of the first and second multilayer encoding neural chains 10-20; and the fusion sub-block df(4) of the decoding computation block D(4) of rank i=4 receives the files generated by the deconvolution sub-block dd(3) of the decoding computation block D(3) of rank 3, as well as residual data delivered via the output residual connections CR40(1) and CR50(1) of the encoding computation blocks E(1) and E'(1) of rank N−(4-1)=1 of the first and second multilayer encoding neural chains 10-20.

Each fusion sub-block df(i) performs a term-by-term operation on the files it receives and which are necessarily of identical sizes.

By term-by-term operation, what is meant is an operation that is performed on each element of an array (an image for example). For example, files of the same sizes, i.e. of same numbers of pixels in height and in width, are fused via a term-by-term operation, i.e. pixel by pixel, to obtain a result file of same size. The value of each pixel of the result file is obtained by applying an aggregate function that may be chosen from minimum (the lowest value of the values of the corresponding pixels in the base images is given to the result pixel), maximum (the highest value of the values of the corresponding pixels in the base images is given to the result pixel), average (a value equal to the average of the values of the corresponding pixels in the base images is given to the result pixel), or any other mathematical function such as an average weighted by source (a value equal to the average of the values of the corresponding pixels in the base images is given to the result pixel, the value of the corresponding pixels being weighted depending on the base image). In the latter case, the weighting may be learned by the neural network according to the types of sources or the types of objects that it is desired to identify. Thus, it is possible to choose to give more credit to such and such a source depending on the object type that it is desired to identify.

Advantageously, the first and second multilayer encoding neural chains 10-20 each comprise first and second encoding computation blocks E(1), E'(1), E(2), E'(2) each performing two convolutions and one downsampling operation, and third and fourth encoding computation blocks E(3), E(3), E(4), E'(4) each performing three convolutions and one downsampling operation.

Furthermore, the decoding multilayer neural chain 30 comprises a first, second and third decoding computation blocks D(1), D(2), D(3), each provided with a deconvolution sub-block dd(1), dd(2), dd(3) for performing a deconvolution, as well as a fourth decoding computation block (D(4)) provided with a deconvolution sub-block dd(4) for performing a deconvolution and an argmax operation.

By argmax operation, what is meant is an operation that, for an input array, returns the coordinates of the element of the array that is the highest. For example, in FIG. 3, an argmax operation conducted on the array I3A would deliver the coordinate of box 6.

At the output 32 of the deconvolution chain 30, the deconvolution sub-block of rank N=4 generates a semantic-segmentation mask image file 5 consisting of pixels coded in values, each value corresponding to one object type from the predefined list, the semantic-segmentation mask image file being of same size R0 as the initial digital image file.

Pixels are significantly better classified in this processed mask file 5 than in mask file 4.

Specifically, it may be seen that the name 1*b* of the issuing company has been distinguished from the logo 1*a*, because they have been represented by two different zones 5*a* and 5*b*, and that they have been classified into two different classes, an image class for the logo (hatched with thin lines, just like the signature) and a text class (dotted zones). The addressee and his address are grouped together in a single zone 5*c* (in plain white), and the general heading has been isolated and classified as such in a zone 5*d* (zone hatched with wide rightward-slanting lines). Likewise, section headings have been isolated and classified as such in zones 5*e* (zones hatched with wide leftward-slanting lines), and the date of signature is no longer confused with these headings since it has been classified as a date of signature in a zone 5*f* (zone dotted with square dots). The paragraphs of each section are grouped into uniform zones 5*h* (dotted zones), and the date present in one of the sections has been isolated and classified as such in a zone 5*i* (zone hatched with vertical lines).

Since the various section are much better classified by virtue of the neural network according to the invention, the subsequent indexing of the text will be much richer in information, and contain far fewer errors.

A neural network presupposes two phases. A first phase of training or learning, during which it learns, from a predefined data set, the parameters of its operations (for example the parameters of the convolution, deconvolution and downsampling filters, etc. from which it is formed) required to obtain the result asked of it. Next, a second phase of exploitation or inference, during which it receives an object that it has never seen before (an image for example) with a view for generating the sought object (the segmentation mask for example) from this input object.

A training dataset is a set of data (for example document images, or digital text files obtained by character recognition, of document image files) chosen to be representative of the all of the data (documents in the context of the invention) that may have to be processed later on. For a given neural network, a training dataset is said to be "pre-annotated" if, in addition to the input data that forms it (documents in the context of the invention), all the output data, corresponding to the results that the neural network is expected to output given the input data, are available.

The invention may advantageously be implemented using, as neural encoding chains, a VGG chain, for example the VGG16 network, which has been illustrated in the figures, or a RESNet chain or any other type of CNN architecture (CNN being the acronym of convolutional neural network).

The method for achieving semantic segmentation of a complex text document to be processed according to the invention therefore comprises the following steps:
  a) obtaining an initial digital image file 1 of the complex text document to be processed, the image file having a determined initial size R0;
  b) performing optical character recognition on the digital image file to obtain a digital text file 2;
  c) providing a predefined list of object types and performing a segmentation operation 3 so as to assign each word of the digital text file an object type chosen from the predefined list of object types;
  d) generating a mask image file 4 coded in values, by replacing each word by a value zone corresponding to the object type assigned to said word, the mask image file being of same determined initial size R0 as the digital image file.

In a neural network 100 according to the invention such as described, the digital image file 1 is encoded in the first encoding multilayer neural chain 10, and the mask image file 4 is encoded in the second encoding multilayer neural chain 20 such that the deconvolution sub-block dd(N) of rank N generates a processed semantic-segmentation mask image file 5 consisting of pixels coded in values, each value corresponding to one object type from the predefined list, the processed semantic-segmentation mask image file 5 being of same size R0 as the initial digital image file.

Subsequently, it is possible to superimpose the digital text file 2 and the processed semantic-segmentation mask image file 5, in order to allow a classification consisting in assigning to each word of the digital text file the object type of the rectangle of the semantic-segmentation mask image file superimposed on said word, and thus to index the text of the document that it is desired to process.

In order to improve this processing, the method advantageously comprises an additional step 6 of post-processing the processed semantic-segmentation mask image file. This step 6 comprises computing coordinates of rectangles covering adjacent pixels of same values, and generating a post-processed semantic-segmentation mask image file 7.

In this case, the indexing of the text is carried out by superimposing the digital text file 2 and the post-processed semantic-segmentation mask image file 7, and by performing a classification consisting in assigning to each word of the digital text file 2 the object type of the rectangle of the post-processed semantic-segmentation mask image file 7 superimposed on said word.

The results are further improved if the first encoding multilayer neural chain is provided with a special computation block at the end of the chain. This option is illustrated in FIGS. 5 and 6.

In this embodiment, the first encoding multilayer neural chain 10 comprises, at the output of the encoding computation block of rank N, an output residual connection for outputting residual data and a main connection 13 with a final global encoding computation block S, of rank N+1.

As illustrated in FIG. 6, block S consists of a succession of sub-blocks linked together by a main connection and devoid of any residual connection.

The block S comprises a first sub-block S1 followed by a second sub-block S2 each performing three convolutions and one downsampling operation. It also comprises, after the second sub-block S2, a third sub-block S3 followed by a fourth encoding sub-block S4 each performing a convolution, then a rectification operation, then a dropout operation.

By rectification operation, what is meant is an operation that assigns to each result of a convolution its value if the latter is positive, or zero if its value is negative. In other words, this operation maps all positive values to themselves and all negative values to zero.

By dropout operation, what is meant is an operation that consists in ignoring certain parameters of an operation block in the training phase, in order to make it more robust. This makes it possible to prevent overfitting, i.e. it makes it possible to learn to reproduce only what has been seen, and therefore learnt. In other words, some values are deliberately "forgotten" in order to allow the network to respond even if it has lost some of its information. This thus forces the neural network to not make its decision only on the basis of a few very specific pieces of information, but to consider the information in a more general way. This type of operation is described, for example, in the article "Improving neural networks by preventing co-adaptation of feature detectors" by Geoffrey E. Hinton, Nitish Srivastava, Alex Krizhevsky, Ilya Sutskever, Ruslan R. Salakhutdinov, Computer Science, Jul. 3, 2012.

Alternatively to the dropout function, any other mechanism for adding noise to the network so as to avoid overfitting effects may be used.

The block S also comprises, after sub-block S4, a fifth sub-block S5 that performs a convolution, itself followed by a sixth sub-block S6 that performs a deconvolution such that a file leaving the sixth block has a size identical to the size of a file leaving the encoding computation block of rank N and entering block S.

In other words, the output file of block S is the same size as the size (i.e. the height and width in number of pixels) of the file that it receives as input. Thus, the parallelism of the neural encoding chains 10 and 20 is not modified, because the size of the object N+1 is strictly identical to the size of the object N.

What matters is that there is no effect on the size, i.e. on the height and width in number of pixels, of the object received by the neural decoding chain 30.

Thus, in the embodiment illustrated in FIG. 5, the fusion sub-block df(1) of the decoding computation block D(1) of rank 1 of the decoding multilayer neural chain 30 receives:
 the files generated by the global encoding computation block S of rank N+1 of the first neural encoding chain 10, residual data delivered via the output residual connection CR40(4) by the encoding computation block E(4) of rank N=4 of the first neural encoding chain 10, and
 the files generated by the encoding computation block E'(4) of rank N=4 of the second neural encoding chain 20.

Since the size of the object delivered by the computation block of rank N is not modified by the block S, the fusion sub-block df(1) of the decoding computation block D(1) of rank 1 receives indirectly the files generated by the encoding computation blocks of rank N of the first neural encoding chain 10, which have been processed by the block S without their size having been modified.

The neural network and the processing method according to the invention may advantageously be implemented directly in an electronic device comprising means for capturing an image of a complex text document to be processed and a central unit programmed to comprise the neural network according to the invention and to implement the method according to the invention.

For example, it may be a question of a scanner, printer, photocopier or smartphone. In this case, they advantageously comprise a connection to a system for indexing and archiving the documents thus processed in order to make it possible to automatically index and archive a large quantity of documents.

The invention claimed is:

1. A multimodal neural network (100) implemented by a computer system comprising a predefined list of object types, for a semantic segmentation of a complex text document to be processed, characterized in that it comprises:
 a first encoding multilayer neural chain (10) for encoding an initial digital image file (1) of the document to be processed of determined initial size (R0), the first neural encoding chain having an input (11) receiving the initial digital image file (1) of the document to be processed, a plurality of computation layers (E(j)) generating files of determined sizes, and an output (12);
 a second encoding multilayer neural chain (20) for encoding a mask image file (4) of the document to be processed of determined initial size, which file is generated at the end of a segmentation operation (3) carried out on a digital text file (2) obtained by performing character recognition on the initial digital image file (1) of the document to be processed, the segmentation operation (3) further comprising assigning to each word of the digital text file (2) an object type chosen from the predefined list of object types and replacing each word with a value zone corresponding to the object type assigned to said word, the second neural encoding chain (20) having an input (21) receiving the mask image file (4), a plurality of computation layers (E'(j)) generating files of determined sizes, and an output (22);
 a decoding multilayer neural chain (30) connected to the output (12) of the first encoding multilayer neural chain (10) and to the output (22) of the second multilayer encoding neural chain (20), and comprising a plurality of computation layers (D(j)) generating files of determined sizes;
 a first bridge (40) of parallel residual connections (CR40($k$)) between the layers (E(j)) of the first encoding multilayer neural chain (10) and the layers (D(j)) of the decoding multilayer neural chain (30);
 a second bridge (50) of parallel residual connections (CR50($k$)) between the layers (E'(j)) of the second encoding multilayer neural chain (20) and the layers (D(j)) of the decoding multilayer neural chain (30),
 the parallel residual connections (CR40($k$), CR50($k$)) of the first and second bridges (40, 50) of residual connections generating files of same size being connected after a layer (D(j)) of the decoding multilayer neural chain (30) generating a semantic-segmentation mask image file (5) consisting of pixels coded in values, each value corresponding to one object type of the predefined list, the semantic-segmentation mask image file (5) being of same size (R0) as the initial digital image file (1).

2. The neural network as claimed in claim 1, wherein:
 the first encoding multilayer neural chain (10) comprises at least N successive encoding computation blocks (E(j)) that are linked together by a main connection (13), N being an integer between 2 and 8, the encoding computation blocks of rank 1 to N−1 further each comprising an output residual connection (CR40($k$)) for outputting residual data, each of the N encoding computation blocks executing at least one convolution and at least one downsampling operation, such that:
  when the encoding computation block of rank 1 (E(1)) receives a file of determined initial size (R0), it generates a file of size of rank 1 smaller than the determined initial size (R0); and that
  when an encoding computation block of rank i (E(i)), i being an integer between 2 and N, receives, via the main connection (13) with the encoding computation block of previous rank i−1 (E(i−1)), a file of size of previous rank i−1, it generates a file of rank i with a size of rank i smaller than the size of previous rank i−1 of the file received from the encoding computation block of previous rank i−1;
 the second encoding multilayer neural chain (20), parallel to the first encoding multilayer neural chain (10), comprises the same number N of successive encoding computation blocks (E'(j)) as the first encoding multilayer neural chain comprises encoding computation blocks (E(j)), the N successive encoding computation blocks (E'(j)) of the second encoding multilayer neural chain (20) being linked together by a main connection (23), the encoding computation blocks of rank 1 to N−1 further each comprising an output residual connection (CR50(k)) for outputting residual data, each of the N encoding computation blocks executing at least one convolution and at least one downsampling operation, such that:

the encoding computation block of rank 1 (E'(1)) receives a file of determined initial size (R0) and generates a file of size of rank 1 smaller than the determined initial size (R0); and that an encoding computation block of rank i (E'(i)), i being an integer between 2 and N, receives, via the main connection (23) with the encoding computation block of previous rank i−1 (E'(i−1)), a file of size of previous rank i−1 and generates a file of rank i with a size of rank i smaller than the size of previous rank i−1 of the file received from the encoding computation block of previous rank i−1; and wherein the decoding multilayer neural chain (30) comprises the same number N of successive decoding computation blocks (D(i)) as the first encoding multilayer neural chain comprises encoding computation blocks, the N decoding computation blocks being linked together by a main connection (33), each decoding computation block (D(i)) comprising a fusion sub-block (df(i)) executing at least one fusion of files of identical sizes, followed by a deconvolution sub-block (dd(i)) executing at least one deconvolution of the files fused by the fusion sub-block (df(i)), the decoding computation blocks (D(i)) being linked to the coding computation blocks (E(i), E'(i)) of the first and second multilayer encoding neural chains (10, 20) such that:

the fusion sub-block (df(1)) of the decoding computation block of rank 1 receives the files generated by the encoding computation blocks (E(N)-E'(N)) of rank N of the first and second multilayer encoding neural chains (10-20);

the fusion sub-block (df(i)) of the decoding computation block of rank i, for i between 2 and N, receives the files generated by the deconvolution sub-block (dd(i−1)) of the decoding computation block (D(i−1)) of rank i−1, as well as residual data delivered via the output residual connections by the encoding computation blocks (E(N−(i−1)), E'(N−(i−1))) of rank N−(i−1) of the first and second multilayer encoding neural chains (10-20).

3. The neural network as claimed in claim 2, wherein the first and second multilayer encoding neural chains (10-20) each comprise first and second encoding computation blocks (E(1), E'(1), E(2),E'(2)) each performing two convolutions and one downsampling operation, and third and fourth encoding computation blocks (E(3), E'(3), E(4), E'(4)) each performing three convolutions and one downsampling operation.

4. The neural network as claimed in claim 2, wherein the decoding multilayer neural chain comprises a first, second and third decoding computation blocks (D(1) (D(1), D(2), D(3)), each provided with a deconvolution sub-block (dd(1), dd(2), dd(3)) for performing a deconvolution, as well as a fourth decoding computation block (D(4)) provided with a deconvolution sub-block (dd(4)) for performing a deconvolution and an argmax operation.

5. The neural network as claimed in claim 2, wherein:
the first encoding multilayer neural chain (10) comprises, at the output of the encoding computation block (E(N)) of rank N, an output residual connection (CR40(N)) for outputting residual data and a main connection (13) to a final global encoding computation block(S), of rank N+1, comprising first and second sub-blocks (S1, S2) each performing three convolutions and one downsampling operation, third and fourth (S3, S4) encoding computation sub-blocks each performing a convolution, followed by a rectification operation, followed by a dropout operation, a fifth sub-block (S5) performing a convolution, and a sixth sub-block (S6) performing a deconvolution such that a file leaving the sixth block (S6) has a size identical to the size of a file leaving the encoding computation block (E(N)) of rank N, and wherein the fusion sub-block (df(1)) of the decoding computation block (D(1)) of rank 1 of the decoding multilayer neural chain (30) receives the files generated by the global encoding computation block(S) of rank N+1 of the first encoding multilayer neural chain (10), residual data delivered via the output residual connection (CR40(N)) by the encoding computation block (E(N)) of rank N of the first encoding multilayer neural chain (10), and the files generated by the encoding computation block (E'(N)) of rank N of the second encoding multilayer neural chain (20).

6. The neural network as claimed in claim 1, wherein the first and second multilayer encoding neural chains (10, 20) are convolutional neural networks chosen from VGG16 networks and RESNet networks.

7. A method for performing semantic segmentation on a complex text document to be processed, characterized in that it comprises the following steps:

a) obtaining an initial digital image file (1) of the complex text document to be processed, the initial digital image file (1) having a determined initial size (R0);

b) performing optical character recognition on the initial digital image file (1) to obtain a digital text file (2);

c) providing a predefined list of object types and performing a segmentation operation so as to assign to each word of the digital text file (2) an object type chosen from the predefined list of object types, d) generating a mask image file (4) coded in values, by replacing each word by a value zone corresponding to the object type assigned to said word, the mask image file (4) being of same determined initial size (R0) as the initial digital image file (1);

e) providing a first encoding multilayer neural chain (10) comprising at least N successive encoding computation blocks (E(N)) linked together by a main connection (13), N being an integer between 2 and 8, the encoding computation blocks of rank 1 to N−1 each comprising an output residual connection (CR40(k)) for outputting residual data, each of the N encoding computation blocks (E(N)) executing at least one convolution and at least one downsampling operation, such that:

the encoding computation block (E(1)) of rank 1 receives a file of determined initial size (R0) and generates a file of size of rank 1 smaller than the determined initial size (R0); and an encoding computation block (E(i)) of rank i, i being an integer between 2 and N, receives, via the main connection (13) with the encoding computation block (E(i−1)) of previous rank i−1, a file of size of previous rank i−1, and generates a file of rank i with a size of rank i smaller than the size of previous rank i−1 of the file received from the encoding computation block of previous rank i−1;

f) providing a second encoding multilayer neural chain (20), said chain being parallel to the first encoding multilayer neural chain (10) and comprising the same number N of successive encoding computation blocks (E'(i)) as the first encoding multilayer neural chain (10), the N successive encoding computation blocks (E'(i)) of the second encoding multilayer neural chain (20) being linked together by a main connection (23), the encoding computation blocks of rank 1 to N−1 each comprising an output residual connection for outputting residual data (CR50(k)), each of the N encoding computation blocks executing at least one convolution and at least one downsampling operation, such that:
- the encoding computation block (E'(1)) of rank 1 receives a file of determined initial size (R0) and generates a file of size of rank 1 smaller than the determined initial size (R0); and
- that an encoding computation block (E'(i)) of rank i, i being an integer between 2 and N, receives, via the main connection with the encoding computation block of previous rank i−1, a file of size of previous rank i−1 and generates a file of rank i with a size of rank i smaller than the size of previous rank i−1 of the file received from the encoding computation block of previous rank i−1;

g) providing a decoding multilayer neural chain (30) comprising the same number N of successive decoding computation blocks (D(i)) as the first encoding multilayer neural chain (10) comprises encoding computation blocks, each decoding computation block being linked together by a main connection (33), each decoding computation block (D(i)) comprising a fusion sub-block (df(i)) executing at least one fusion of files of identical sizes, followed by a deconvolution sub-block (dd(i)) executing at least one deconvolution of the files fused by the fusion sub-block, the decoding computation blocks (D(i)) being linked to the coding computation blocks (E(i), E'(i)) of the first and second multilayer encoding neural chains (10, 20) such that:
- the fusion sub-block (df(1)) of the decoding computation block (D(1)) of rank 1 receives the files generated by the encoding computation blocks (E(N), E'(N)) of rank N of the first and second multilayer encoding neural chains;
- the fusion sub-block (df(i)) of the decoding computation block of rank i, for i between 2 and N, receives the files generated by the deconvolution sub-block (D(i−1)) of the decoding computation block of rank i−1, as well as residual data delivered via the output residual connections (CR40(N−(i−1)), CR50(N−i−1))) of the encoding computation blocks of rank N−(i−1) of the first and second multilayer encoding neural chains h) encoding the initial digital image file (1) in the first encoding multilayer neural chain (10);

i) encoding the mask image file (4) in the second encoding multilayer neural chain (20);

j) the deconvolution sub-block (dd(N)) of rank N generating a semantic-segmentation mask image file (5) consisting of pixels coded in values, each value corresponding to one object type from the predefined list, the semantic-segmentation mask image file (5) being of same size (R0) as the initial digital image file (1).

8. The method as claimed in claim 7, further comprising a step l) of superimposing the digital text file (2) and the semantic-segmentation mask image file (5), and a classifying step m) consisting in assigning to each word of the digital text file (2) the object type of the rectangle of the semantic-segmentation mask image file (5) superimposed on said word.

9. The method as claimed in claim 7, further comprising a step k) of post-processing the semantic-segmentation mask image file (5), this step comprising computing coordinates of rectangles covering adjacent pixels of same value and generating a post-processed semantic-segmentation mask image file (7), a step l') of superimposing the digital text file (2) and the post-processed semantic-segmentation mask image file (7), and a classifying step m') consisting in assigning to each word of the digital text file (2) the object type of the rectangle of the post-processed semantic-segmentation mask image file (7) superimposed on said word.

10. An electronic device comprising a means for capturing an image of a complex text document to be processed and a central unit programmed to comprise a neural network, the neural network comprising:
- a first encoding multilayer neural chain (10) for encoding an initial digital image file (1) of the document to be processed of determined initial size (R0), the first neural encoding chain having an input (11) receiving the initial digital image file (1) of the document to be processed, a plurality of computation layers (E(j)) generating files of determined sizes, and an output (12);
- a second encoding multilayer neural chain (20) for encoding a mask image file (4) of the document to be processed of determined initial size, which file is generated at the end of a segmentation operation (3) carried out on a digital text file (2) obtained by performing character recognition on the initial digital image file (1) of the document to be processed, the segmentation operation (3) further comprising assigning to each word of the digital text file (2) an object type chosen from the predefined list of object types and replacing each word with a value zone corresponding to the object type assigned to said word, the second neural encoding chain (20) having an input (21) receiving the mask image file (4), a plurality of computation layers (E'(j)) generating files of determined sizes, and an output (22);
- a decoding multilayer neural chain (30) connected to the output (12) of the first encoding multilayer neural chain (10) and to the output (22) of the second multilayer encoding neural chain (20), and comprising a plurality of computation layers (D(j)) generating files of determined sizes;
- a first bridge (40) of parallel residual connections (CR40(k)) between the layers (E(j)) of the first encoding multilayer neural chain (10) and the layers (D(j)) of the decoding multilayer neural chain (30);
- a second bridge (50) of parallel residual connections (CR50(k)) between the layers (E'(j)) of the second encoding multilayer neural chain (20) and the layers (D(j)) of the decoding multilayer neural chain (30),
  - the parallel residual connections (CR40(k), CR50(k)) of the first and second bridges (40, 50) of residual connections generating files of same size being connected after a layer (D(j)) of the decoding multilayer neural chain (30) generating a semantic-segmentation mask image file (5) consisting of pixels coded in values, each value corresponding to one object type of the predefined list, the semantic-segmentation mask image file (5) being of same size (R0) as the initial digital image file (1); and
- the central unit programmed to implement the method as claimed in claim 7.

11. The electronic device as claimed in claim 10, wherein the electronic device is chosen from a scanner, a printer, a photocopier and a smartphone.

\* \* \* \* \*